US011338444B2

(12) United States Patent
Ostrow et al.

(10) Patent No.: US 11,338,444 B2
(45) Date of Patent: May 24, 2022

(54) ROBOTIC CARRIER DEVICE AND SYSTEM FOR PREPARING FOOD PRODUCTS

(71) Applicant: Marmon Foodservice Technologies, Inc., Osseo, MN (US)

(72) Inventors: Michael Ostrow, Crystal Lake, IL (US); Vincenzo DiFatta, Wood Dale, IL (US); Arsalan Aslam, Bloomingdale, IL (US); Michal Augustyniak, Elgin, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 212 days.

(21) Appl. No.: 16/827,982

(22) Filed: Mar. 24, 2020

(65) Prior Publication Data

US 2020/0316785 A1    Oct. 8, 2020

Related U.S. Application Data

(60) Provisional application No. 62/829,244, filed on Apr. 4, 2019.

(51) Int. Cl.
*B25J 11/00* (2006.01)
*B25J 5/00* (2006.01)
*B25J 9/16* (2006.01)

(52) U.S. Cl.
CPC .......... *B25J 11/0045* (2013.01); *B25J 5/007* (2013.01); *B25J 9/1666* (2013.01)

(58) Field of Classification Search
CPC combination set(s) only.
See application file for complete search history.

(56) References Cited

U.S. PATENT DOCUMENTS

| | | | |
|---|---|---|---|
| 8,918,202 B2* | 12/2014 | Kawano | G05D 1/0297 700/216 |
| 9,403,566 B2* | 8/2016 | Jacobsen | B62D 55/0655 |
| 9,446,512 B1* | 9/2016 | Moses | G05D 1/0088 |
| 10,012,992 B2* | 7/2018 | Shydo, Jr. | B25J 9/1697 |

(Continued)

FOREIGN PATENT DOCUMENTS

| | | |
|---|---|---|
| CN | 101992982 A | 3/2011 |
| CN | 203745904 U | 7/2014 |

(Continued)

OTHER PUBLICATIONS

International Search Report and Written Opinion for International Application No. PCT/US2020/024913 dated Jun. 11, 2020.

*Primary Examiner* — Kyle O Logan
(74) *Attorney, Agent, or Firm* — Andrus Intellectual Property Law, LLP

(57) ABSTRACT

A device having a platform configured to support the food products, a driving system configured to move the device, and a location detector configured to identify the location of the device within the area. A control system is configured to control the driving system based on the location of the device identified by the location detector, where the control system is configured to move the device along a primary path defined between a starting point and an ending point and to one or more fulfilment positions therebetween. The food products are received on the platform when the device moves to the one or more fulfilment positions.

20 Claims, 7 Drawing Sheets

(56) References Cited

U.S. PATENT DOCUMENTS

| | | | | |
|---|---|---|---|---|
| 10,106,383 B2* | 10/2018 | Shen | .......................... | B66F 3/08 |
| 10,503,143 B1* | 12/2019 | Polic | .................... | G05B 19/045 |
| 2011/0168775 A1* | 7/2011 | Van Zetten | .......... | B67D 1/0888 |
| | | | | 235/381 |
| 2015/0197397 A1* | 7/2015 | Razumov | ............. | B65G 1/0492 |
| | | | | 414/279 |
| 2017/0144299 A1* | 5/2017 | Lafaye | ................... | B25J 9/1628 |
| 2017/0174343 A1* | 6/2017 | Erickson | .............. | A61B 5/4815 |
| 2017/0364073 A1* | 12/2017 | Guy | .......................... | B25J 5/005 |
| 2018/0037410 A1* | 2/2018 | DeWitt | ................... | B07C 3/087 |
| 2018/0099810 A1* | 4/2018 | Wu | ....................... | B65G 1/0492 |
| 2020/0051001 A1* | 2/2020 | Donnelly | ............... | G06Q 10/02 |

FOREIGN PATENT DOCUMENTS

| | | |
|---|---|---|
| CN | 207548772 U | 6/2018 |
| JP | 4136750 B2 | 8/2008 |
| JP | 4736200 B2 | 7/2011 |
| WO | 2008087171 A1 | 7/2008 |
| WO | 2017006291 A1 | 1/2017 |
| WO | 2019109137 A1 | 6/2019 |
| WO | 2019178172 A1 | 9/2019 |
| WO | 2019238865 A1 | 12/2019 |

\* cited by examiner

ROBOTIC CARRIER DEVICE AND SYSTEM FOR PREPARING FOOD PRODUCTS

CROSS REFERENCE TO RELATED APPLICATIONS

This application claims the benefit of U.S. Provisional Patent Application No. 62/829,244, filed Apr. 4, 2019, which is incorporated herein by reference in its entirety.

FIELD

The present disclosure generally relates to robotic carrier devices and systems for preparing food products, and more particularly to robotic carrier devices and systems for preparing beverages in a non-serial manner.

BACKGROUND

The Background and Summary are provided to introduce a foundation and selection of concepts that are further described below in the Detailed Description. The Background and Summary are not intended to identify key or essential features of the potentially claimed subject matter, nor are they intended to be used as an aid in limiting the scope of the potentially claimed subject matter.

The following patent and patent application are incorporated herein by reference:

PCT Publication No. WO 2008/087171 discloses an autonomous mobile robotic device, comprising an integrated machine for producing beverages or liquid comestibles.

U.S. Pat. No. 9,446,512 discloses a swarm of robots and a related method of operating the swarm. The robots are programmed to start at a nest and to select a dispersal direction from a uniform random distribution. The robots travel along the dispersal direction until transitioning to a search mode upon reaching a search site, where the robot performs a correlated random walk with fixed step size and direction and using a standard deviation to determine how correlated the direction of the next step of the robot is with the direction of the previous step. If no resource is found within predetermined time t independently determined by each of said robots, the robot returns to the nest and repeats the above steps.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a carrier device for transporting food products within an area. The device includes a platform configured to support the food products, a driving system configured to move the device, and a location detector configured to identify the location of the device within the area. A control system is configured to control the driving system based on the location of the device identified by the location detector, where the control system is configured to move the device along a primary path defined between a starting point and an ending point and to one or more fulfillment positions therebetween. The food products are received on the platform when the device moves to the one or more fulfilment positions.

Another embodiment generally relates to a system for assembling a food product in a container within an area. The system includes one or more fulfillment positions each having a component of the food product to be assembled. A primary path is defined within the area and extends between a starting point and an ending point with the one or more fulfillment positions positioned therebetween. A device is configured to move the container along the primary path during assembly of the food product. A location detector is configured to identify the location of the device within the area. A control system is configured to control movement of the device based on the location of the device identified by the location detector. The food product is assembled in the container as the device moves through the one or more fulfilment positions.

Another embodiment generally relates to a system for preparing beverages in cups within an area. The system includes a plurality of fulfillment positions each having a component of the beverage to be assembled. A primary path is defined within the area and extending between a starting point and an ending point with the plurality of fulfillment positions positioned therebetween. A secondary path is defined within the area that is separate from the primary path and that also extends between the starting point and the ending point. Each of a plurality of devices is configured to move one of the cups along the primary path in a trackless manner during assembly of one of the beverages. A plurality of order tags associated with the plurality of devices contains instructions for preparing the beverages, and a plurality of order scanners associated with the plurality of fulfillment positions that read the order tags and cause the plurality of fulfillment positions to dispense the components associated therewith according to the instructions. The system further includes location detectors that are each corresponding to one of the plurality of devices. The location detectors are configured to identify the locations of the devices within the area. The system further includes collision detectors each corresponding to one of the plurality of devices, and control systems each corresponding to one of the plurality of devices that are configured to control movement of the plurality of devices based on the locations identified by the location detectors, respectively. The control systems are further configured to move the devices between the primary path and the secondary path to prevent a collision with another object based on the collision detector. The food product is assembled in the container as the device moves through the one or more fulfilment positions.

Various other features, objects and advantages of the disclosure will be made apparent from the following description taken together with the drawings.

BRIEF DESCRIPTION OF THE DRAWINGS

The drawings illustrate embodiments for carrying out the disclosure. The same numbers are used throughout the drawings to reference like features and like components. In the drawings.

DETAILED DISCLOSURE

Figure 1A:
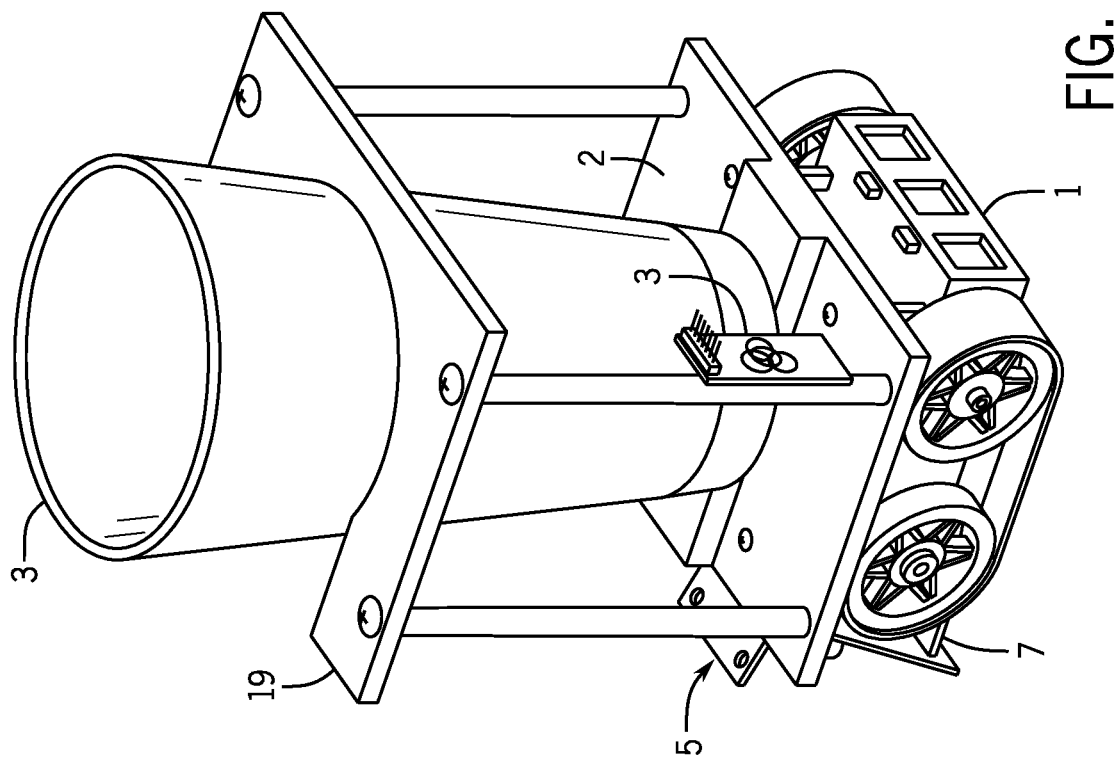
FIGS. 1A and 1B are perspective front and back views of an exemplary device arranged to transport food products according to the present disclosure.
Figure 1B:
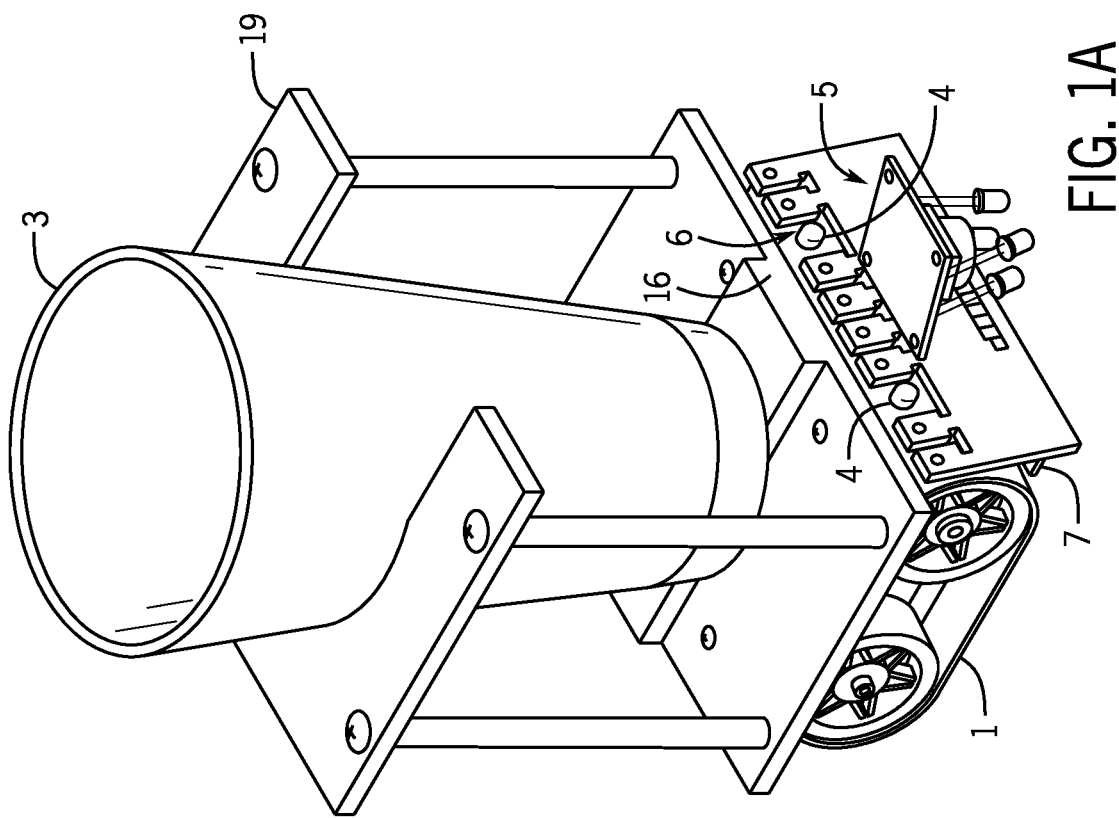

This written description uses examples to disclose embodiments of the present disclosure and also to enable any person skilled in the art to practice or make and use the same. The patentable scope of the invention is defined by the potential claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present disclosure generally relates to systems and methods for transporting food products. For the sake of clarity, the terms "food" and "food product" is used throughout the disclosure, but also includes beverages and non-consumable goods being assembled and/or transported from one place to another. In this same manner, "transporting" food products is not limited to moving final or completed goods, but includes holding and/or moving containers, ingredients, and works-in-process as well, for example.

Through research and experimentation, the present inventors have identified many problems with typical conveyor platforms used for the assembly of food products. One such problem is the serial-nature of present systems for assembling and transporting food products. In particular, systems and devices presently known in the art do not allow one order (or a device carrying the one order) to pass over others in the process. For example, subsequent devices are delayed by a first or leading device that requires additional time, is operating at a slower speed, and/or has stopped. Exemplary carousel-based devices known in the art are Cornelius Automated Beverage Systems 1.0 and 2.0 (ABS 1.0 and 2.0), which are commercially available.

Another problem is the difficulty in cleaning the systems presently known in the art, which typically have many parts that must be disassembled to complete the task. Further explanation of these problems, as well as some of the solutions provided by the exemplary devices, systems, and methods described herein, are provided below.

FIGS. 1A-2B depict an exemplary device and corresponding system for transporting food products according to the present disclosure. In particular, FIGS. 1A-2B depict a carrier device 1, which begins at a starting point A and proceeds until reaching an ending point Z, passing through a number of fulfillment positions B-D therebetween. While the present embodiment shows a linear path between the starting point A and ending point Z, other shapes and configurations are also anticipated, including continuous loops, for example. It should also be recognized that in certain embodiments (see FIG. 4), the starting "point" A and/or ending "point" B need not be a single position, but may instead encompass a zone or region, for example.

In the embodiment shown in FIGS. 1A-2B, the carrier device 1 includes a platform 2 designed to support the particular product being created, such as a cup 3 configured to contain a beverage. A support 19 may also be provided to further retain the food product on the platform 2, which may be customized for foods versus beverages, for example. Each carrier device 1 is assigned a particular order to fulfill, along with a corresponding recipe for fulfilling that order (e.g. a 16 oz. dark roast regular coffee with 1 unit of almond milk). The carrier device 1 fulfills an order by proceeding along a path 10 between the starting point A and the ending point Z by use of a driving system 7 configured to propel the carrier device 1. The driving system 7 may include a continuous track-based system (e.g. tank treads), driving wheels configured to ride on rails, may incorporate pairs of steerable and non-steerable wheels, and/or incorporate omni-directional wheels, and/or the like. The driving system 7 may further incorporate motors, gears, and/or batteries for propelling the carrier devices 1 in a manner known in the art. It should be recognized that the term "track-less" as used herein refers to a system in which the carrier device 1 is not constrained by a rail, for example, and is moveable other than forward and backward along the same fixed path.

Navigation of the carrier device 1 is provided based on inputs from one or more location detectors 5, which in the present embodiment are each removable with carrier device 1 and detect location indicators 11 along the path 10 within an overall product region 99. Exemplary location detectors 5 include, but are not limited to, RFID scanners, NFC sensors, IR sensors, optical sensors, radar-based systems, or other detection devices known in the art. In the example shown, a solid black line is provided as the path 10, whereas colors are used as the location indicator 11. However, it should be recognized that types of paths 10 and location indicators 11, including other visual forms of each, physical devices such as RFID tags, rails, and/or the like, are also anticipated by the present disclosure. In the example shown, the carrier device 1 proceeds along the path 10 between the starting point A and the ending point Z, detecting each location indicator 11 along the way.

Once the carrier device 1 arrives at a location indicator 11 corresponding to a fulfillment position for a given recipe being completed, the carrier device 1 stops and/or moves from the path 10 into that fulfilment position (such as fulfilment position B) to receive further components of the final product (e.g. ingredients such as cream and/or sugar), and/or further processing (e.g. stirring, frothing, and/or receiving a lid on the cup 3). It should be recognized that receiving components and/or processing are both referred to herein as simply fulfillment. In certain embodiments, once the carrier device 1 has proceeded all the way to the ending point Z, every required fulfillment position necessary for the order recipe would have been visited by the carrier device 1. For example, in circumstances in which the carrier device 1 is assembling a custom-order coffee beverage, a fulfilment position B may correspond to the filling of caffeinated, black coffee, whereas fulfilment position C corresponds to decaffeinated, black coffee, fulfilment positions D and E to caffeinated and decaffeinated black tea, respectively, and so on. The carrier device 1 may then also stop at fulfilment positions F and/or G (not shown) if the particular recipe calls for the addition of cream and/or sugar, respectively. Additional exemplary fulfilment positions may include other types of tea, a soda dispenser, non-sugar sweeteners, flavor dispensers, and/or carbonation or other gas-infusion stations. It should be recognized that same components may be available at multiple fulfilment positions, and a fulfillment position may have multiple components (e.g. nozzles for multiple types of creamer such as flavored varieties). Likewise, in other embodiments one or more components or processing steps may take place before the starting point A and/or ending point B, such as manually placing a lid, for example.

The present inventors have identified that although the path 10 may be established to prevent collisions between the carrier device 1 and walls or other obstacles, including having fulfillment positions off the path 10, there remains a risk of collision with other carrier devices 1. Therefore, additional sensors or detectors, such as a proximity sensor 4, are incorporated to provide information to the carrier device 1 with respect to proximity to other carrier devices 1. As with the location detectors 5, exemplary proximity sensors 4 may include RFID scanners, NFC sensors, IR sensors, optical sensors, radar-based systems, or other detection devices known in the art.

Figure 2A:
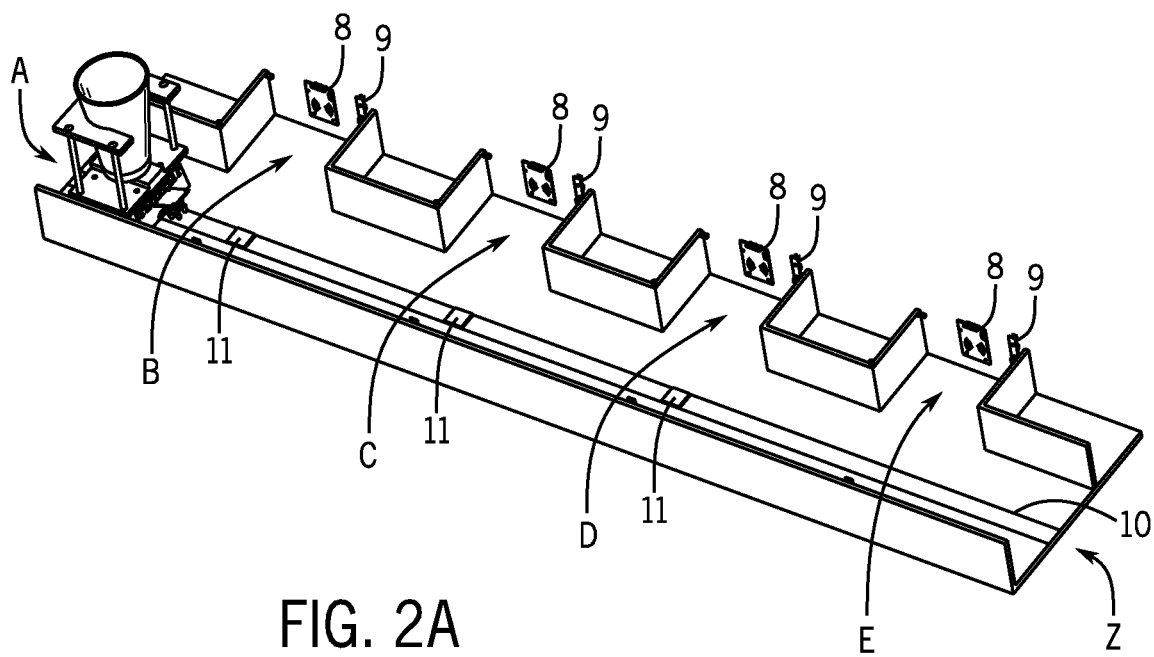
FIGS. 2A and 2B are isometric and close up top views of a system incorporating the device of FIGS. 1A and 1B.
Figure 2B:
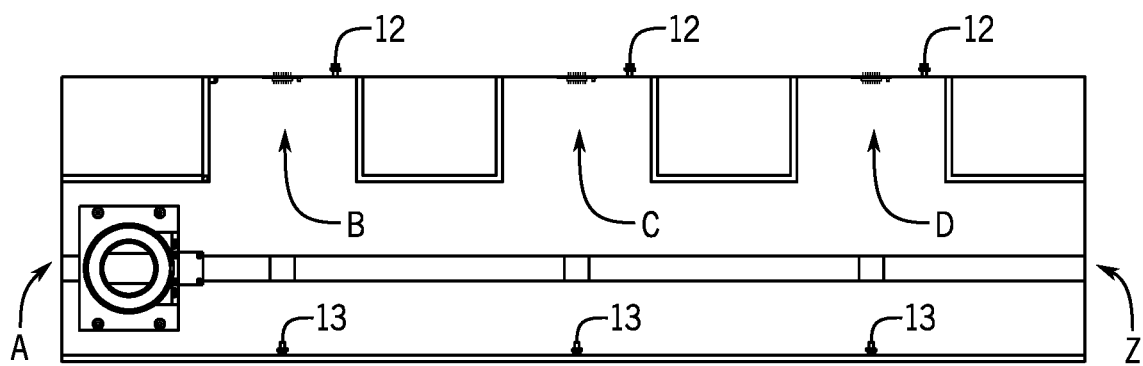

FIGS. 2A and 2B depict an exemplary system 100 for preventing collisions between carrier devices 1, including when carrier devices 1 stop and/or enter and exit the path 10 at one of the fulfilment positions between the starting point A and the ending point Z. Before a carrier device 1 enters into a fulfilment position required for its present order, which in the embodiment shown is off the path 10, the carrier device 1 first confirms that no other carrier device 1 is already present within that particular fulfilment position. To also prevent blocking this earlier carrier device 1 from exiting the fulfilment position, the inventors have identified that it is advantageous to identify the fulfilment position being occupied before the subsequent carrier device 1 reaches the location indicator 11 corresponding to that fulfilment position (and/or before the carrier 1 blocks the exit). For example, a global control system 20 (FIG. 5, discussed below) can coordinate this information between carrier devices 1.

Figure 3A:
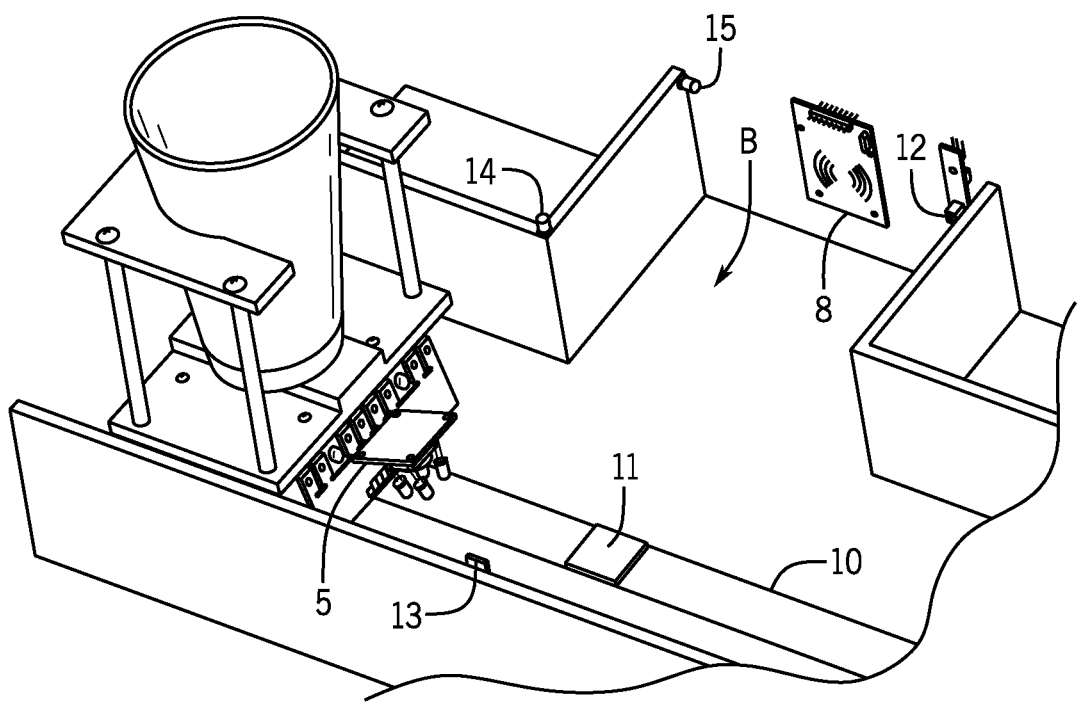
FIGS. 3A and 3B are further close ups of FIGS. 2A and 2B, respectively.
Figure 3B:
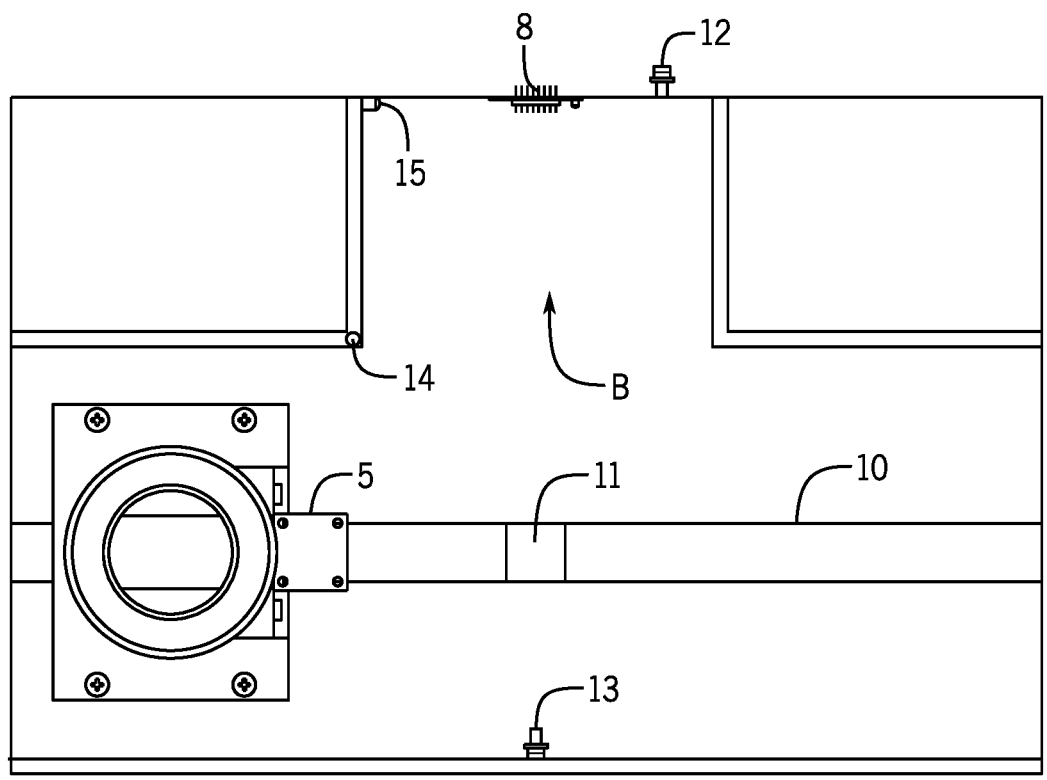

As shown in FIGS. 3A and 3B, the presently disclosed systems further include occupancy sensors 12 to determine when a carrier device 1 is present within a given fulfilment position. Occupancy indicators 14 are further provided to indicate when a carrier device 1 is detected by an occupancy sensor 12. The exemplary system 100 further includes in-process indicators 15 that indicate when such a carrier device 1 is "in-process" (e.g., receiving product and/or processing) within that fulfilment position. Similarly, the carrier device 1 includes a status sensor 6 configured to detect the occupancy indicators 14 and in-process indicators 15 (as may be activated due to the fulfillment activities of another carrier device 1, for example). This configuration may be particularly suitable for a system not having a global control system 20, for example. However, these features are not mutually exclusive. However, these features are not mutually exclusive. In the example shown, the occupancy indicators 14 and in-process indicators 15 are infrared emitting LEDs and the status sensor 6 is an infrared sensor, though other devices are also anticipated by the present disclosure. For example, additional devices may include RFID scanners, NFC sensors, IR sensors, optical sensors, radar-based systems, or other detection devices known in the art, as discussed above with respect to proximity sensors 4.

In the embodiment shown in FIGS. 3A-3B, an occupancy indicator 14 is positioned next to a given fulfillment position (such as position B), which is illuminated when a proximity sensor 12 within that fulfillment position determines that a carrier device 1 is present within that fulfillment position. This ensures that another carrier device 1 waiting to enter the fulfillment position does not block the exit of the earlier carrier device 1 already in the fulfillment position (e.g., that other carrier device 1 can wait out of the way), also preventing a collision therebetween. Once the carrier device 1 already in the fulfillment position exits, the proximity sensor 14 detects the position is once again vacant and the subsequent carrier device 1 may then proceed into the fulfillment position. Once again, the proximity sensor 12 then detects the next carrier device 1 and activates the occupancy indicator 14 to prevent yet another carrier device 1 from entering the fulfillment position.

In addition to the occupancy indicator 14 activating, in certain embodiments an order tag 16 associated with the carrier device 1 is detected by an order scanner 8 positioned within the fulfillment position when the carrier device 1 enters. In the example shown, the order tag 16 and order scanner 8 are RFID tags and RFID scanners, respectively. However, other technologies may also be employed, including those discussed above. The detection of the order tag 16 by the order scanner 8 forms a link between the fulfillment position and the particular carrier device 1 receiving product therein, including the specific order to be fulfilled. The order tag 16 may provide details of the particular order directly (e.g., a barcode, or fulfillment instructions stored as data 47, discussed below), or may simply represent order information (e.g. order number 71) accessible within a cloud system 30 (FIGS. 5-6) to decipher the specific recipe to be fulfilled, for example. The order tag 16 may be necessary when the fulfillment position offers multiple different components that may be dispensed, to communicate specific quantities to be dispensed and/or specific processing, and/or the like.

While part of an order is being fulfilled within a particular fulfillment position, the in-process indicator 15 will be illuminated to provide an indication to the carrier device 1 that the fulfillment process is not yet completed. This informs the carrier device 1 as to when it may exit the fulfillment station. In certain embodiments, the in-process indicator 15 remains activated even after fulfillment has completed if an optional second proximity sensor 13 (e.g., in certain embodiments, located in or near the fulfillment position) determines that another carrier device 1 is approaching that particular fulfillment position. Keeping the in-process indicator 15 activated until the exit path is clear prevents the carrier device 1 within the fulfillment position from causing a collision when backing out. Once the second proximity sensor 13 indicates that the path is clear, the in-process indicator 15 is allowed to turn off, indicating to the carrier device 1 that it may back out of the fulfillment station and continue on its path towards the ending point Z.

Figure 4:
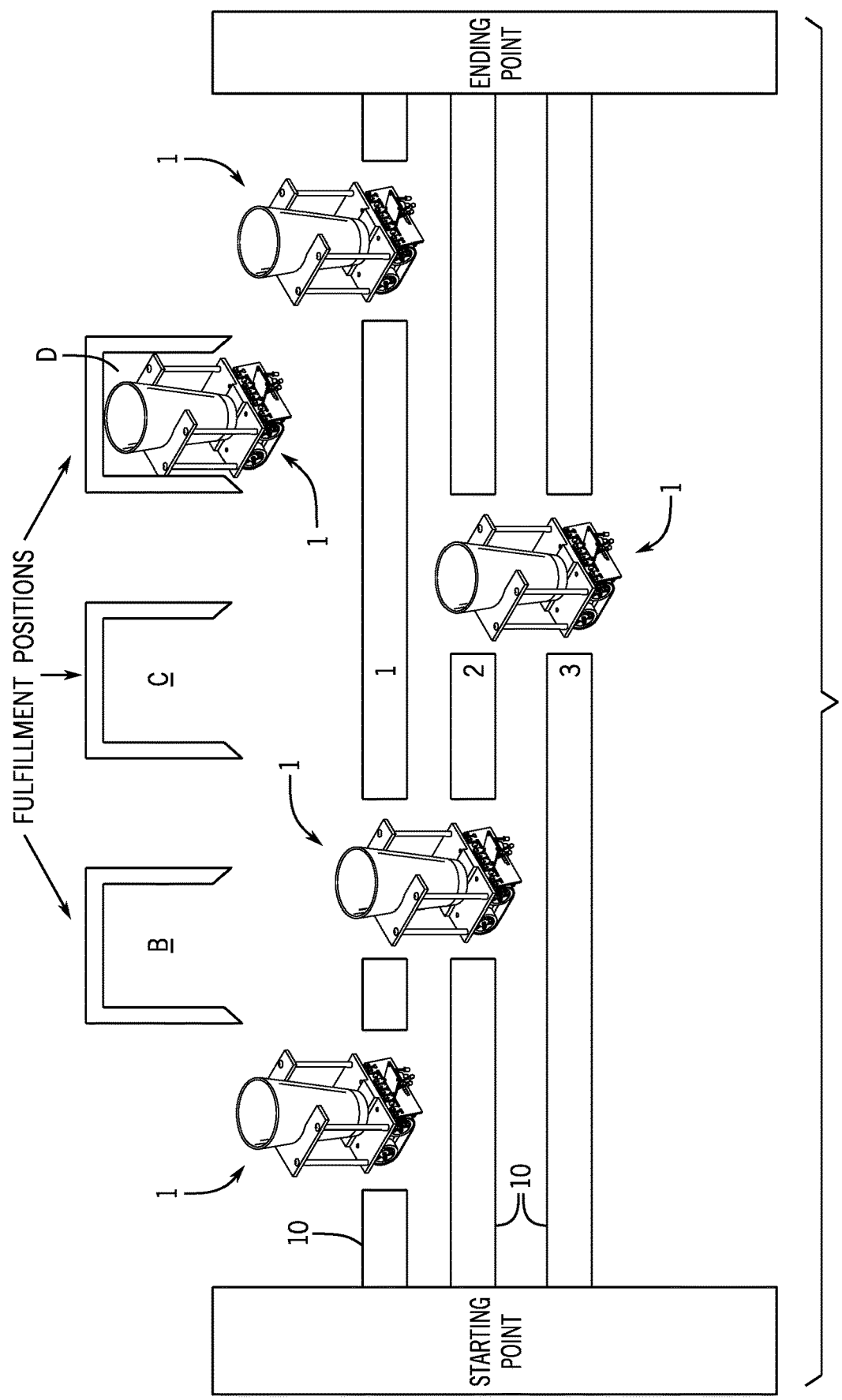
FIG. 4 is a top view depicting another exemplary configuration for a system incorporating devices similar to that shown in FIG. 1A.

As shown in FIG. 4, certain embodiments of the presently disclosed system provide for multiple paths 10 between the starting point A and the ending point Z, shown here as lanes L1-L3. In this configuration, certain lanes L1-L3 may be indicated as fast lanes versus slow lanes, optimizing the speed by which a given carrier device 1 may proceed to the ending point Z. For example, once an order has been completed for a particular carrier device 1 (i.e., the food product has received all components and processing available between the starting point A and ending point Z), that carrier device 1 may proceed to a designated "fast lane" or secondary path (such as lane L3) occupied only by carrier devices 1 having no additional stops before reaching the ending point Z. In the same manner, lane L1 may be designated as a "slow lane" or a primary path corresponding to carrier devices 1 working on orders, and/or orders with either many stops, or lengthier stops. In certain examples, the secondary path is lane L2 and is used at least in part as a passing lane for going around slower carrier devices 1 in the primary path of lane L1, while a third path lane L3 is reserved for mostly or entirely for carrier devices 1 having completed orders. This enables orders to reach the ending point Z as quickly as possible, without being limited by other orders still in process as is the case for systems and methods presently known in the art.

Figure 5:
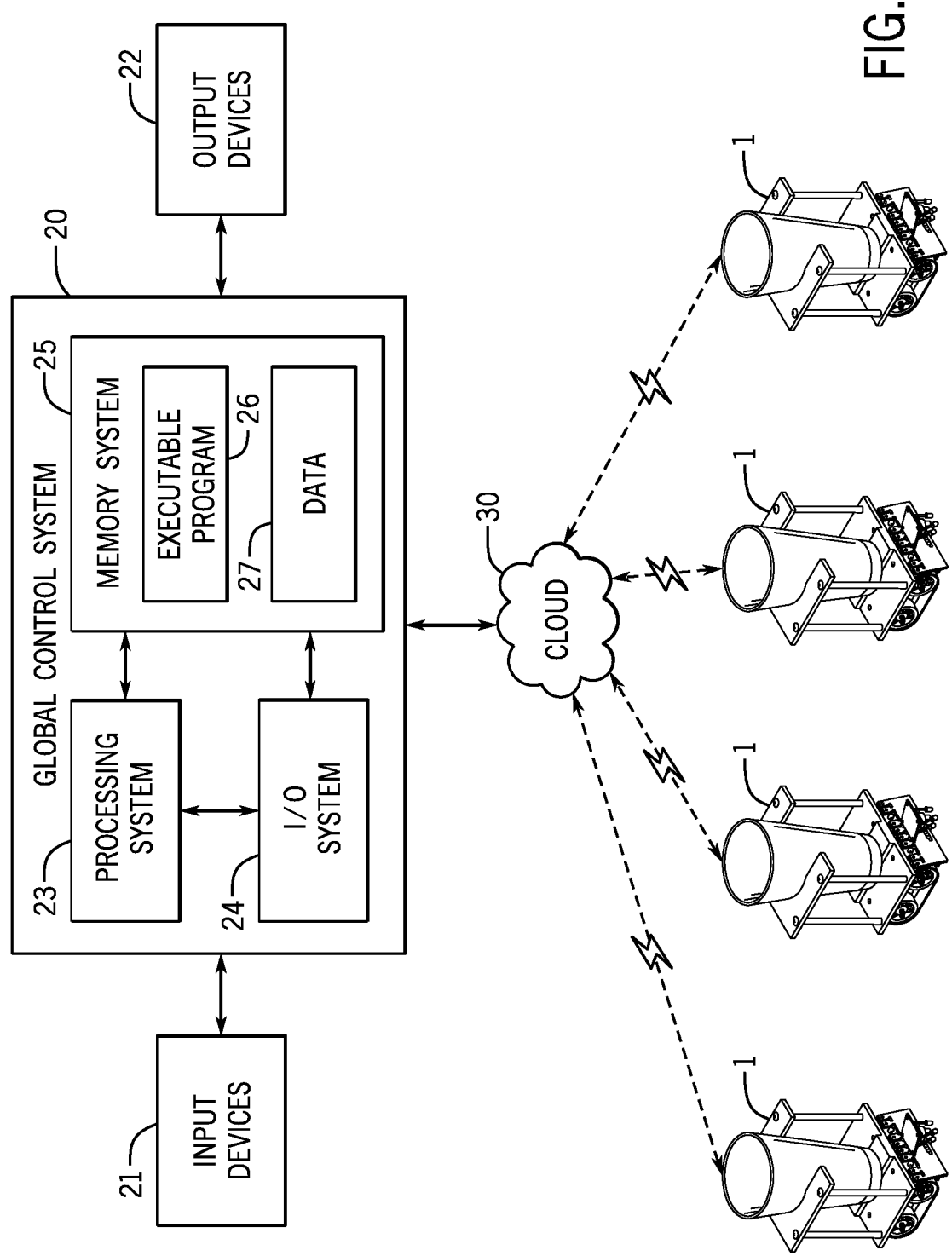
FIGS. 5 and 6 depict exemplary schematic views for controlling and communicating devices within the presently disclosed system.
Figure 6:
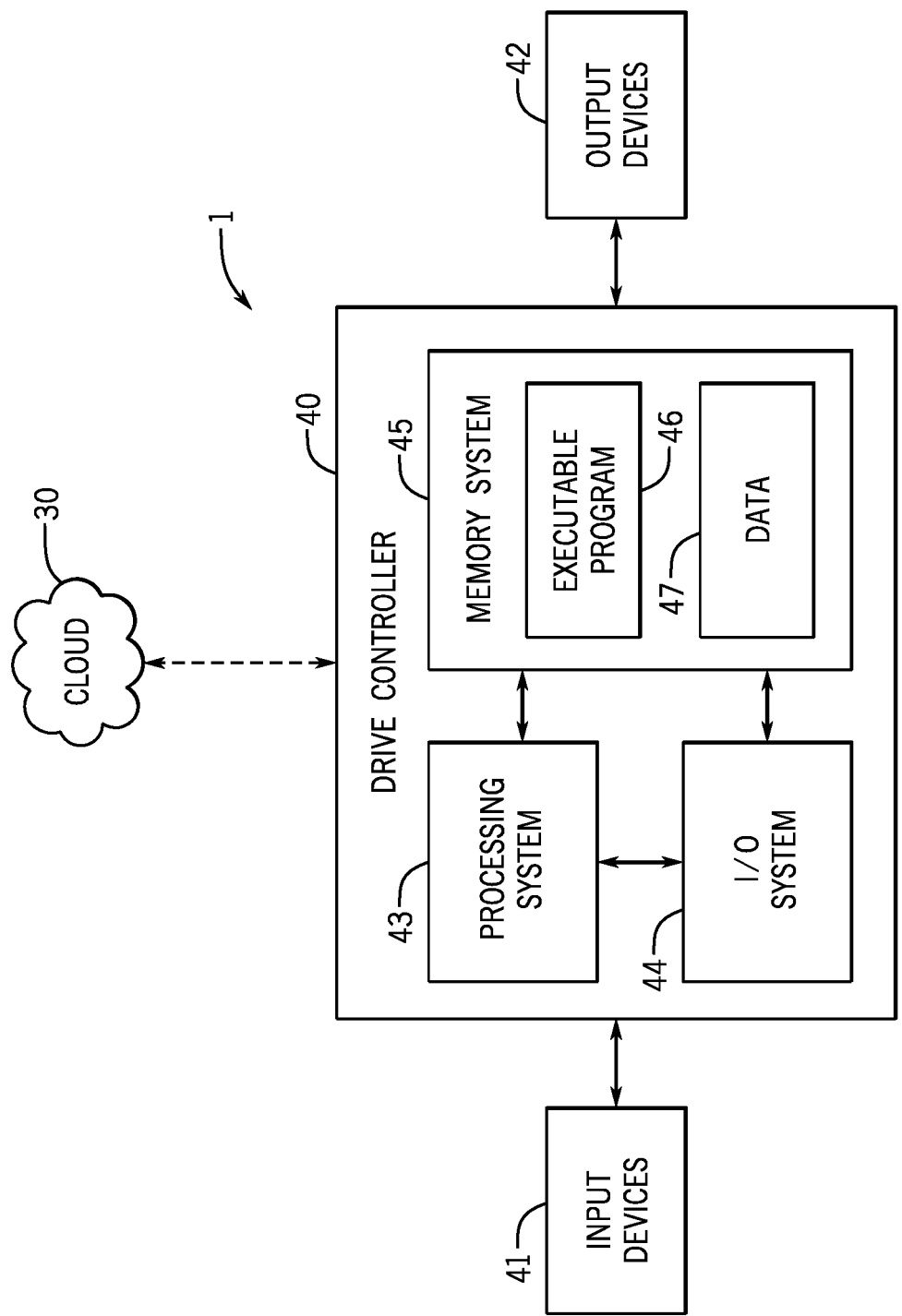

FIGS. 5-6 depict exemplary systems for communicating among and between carrier devices 1 and fulfilment positions. In the example shown, a global control system 20 facilitates communication between input devices 21 (e.g., a POS ordering system), and output devices 22 (e.g., a monitor or receipt system), as well as with the carrier devices 1. This communication may be provided by a cloud 30 networking configuration, for example.

The global control system 20 and drive controllers 40, also referred to as control systems, each include a processing system 23, 43, a memory system 25, 45 that stores an executable program 26, 46 and data 27, 47, and input/output (I/O) interfaces 24, 44 for communicating with other devices (such as input devices 21, 41 and output devices 22, 42, as well as carrier devices 1). The processing system 23, 43 loads and executes the executable programs 26, 46 from the memory system 25, 45, which direct the global control system 20 and drive controller 40, respectively, to operate as described in further detail below. The processing system 23, 43 may be implemented as a single microprocessor or other circuitry, or be distributed across multiple processing devices or sub-systems that cooperate to execute the executable programs 26, 46 from the memory system 25, 45. Non-limiting examples of the processing system include general purpose central processing units, applications specific processors, and logic devices.

The memory system 25, 45 may comprise any storage media readable by the processing system 23, 43 and capable of storing executable program 26, 46. The executable programs 26, 46 may be implemented as a single storage device, or be distributed across multiple storage devices or sub-systems that cooperate to store computer readable instructions, data structures, program modules, or other data. The memory system 25, 45 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

It should be recognized that certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

Figure 7:
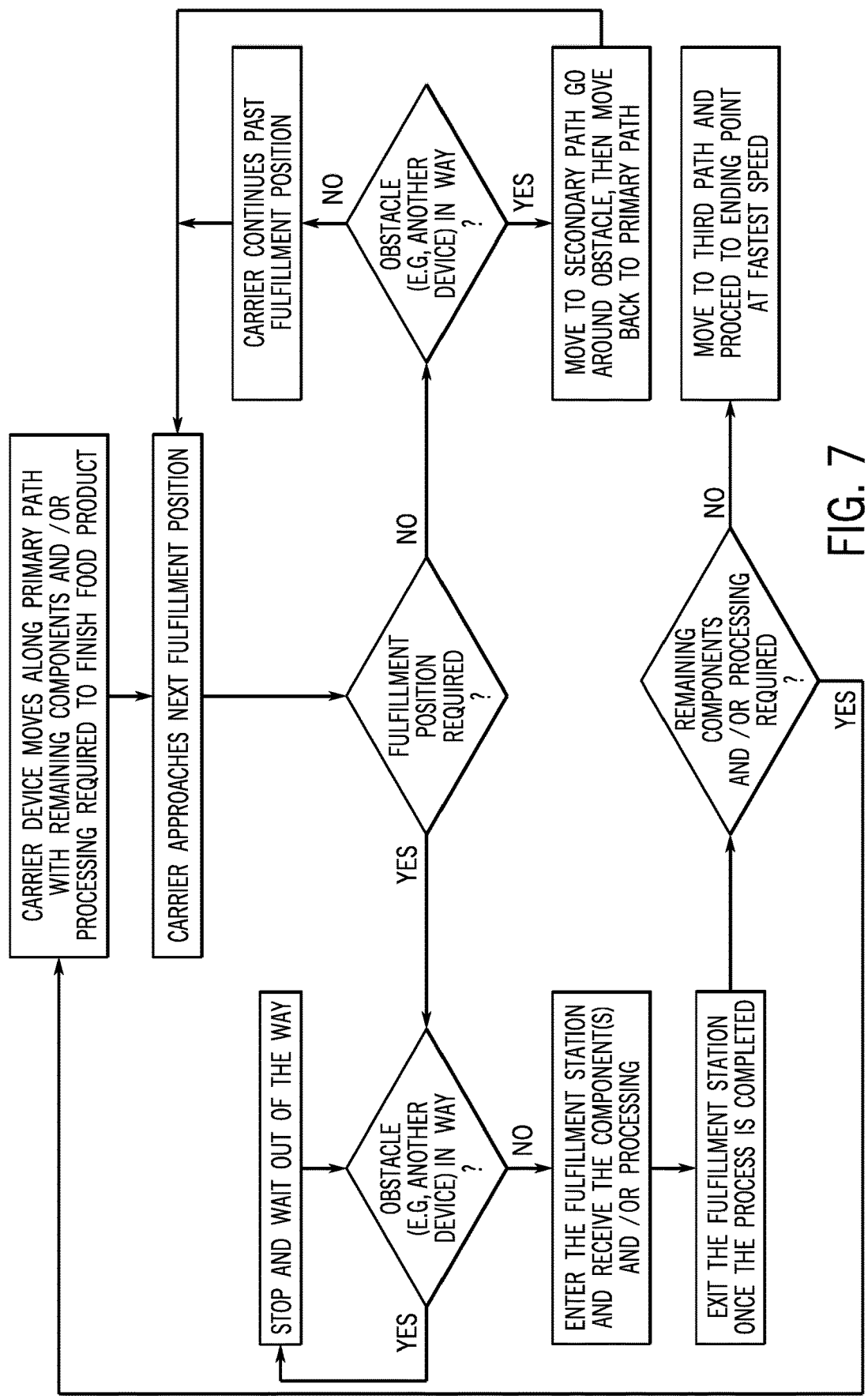
FIG. 7 depicts an exemplary process flow for controlling a carrier device according to the present disclosure.

FIG. 7 depicts an exemplary process flow for controlling a carrier device according to the present disclosure, including through incorporation of components and processes previously discussed. The method 200 begins in step 202 with the carrier device moving along a primary path, such as lane L1 in FIG. 4, while having remaining components and/or processing required to finish the food product associated therewith. As the carrier approaches the next fulfillment position in step 204, step 206 provides for determining whether that particular fulfillment position is required for completing the food product associated with that carrier device. If not, it is determined in step 208 whether there is an obstacle, such as another carrier device, blocking the path of the carrier device from moving beyond the fulfillment position. If not, the carrier device continues past that fulfillment position in step 210, repeating the process at step 204. If instead it is determined in step 208 that an obstacle is blocking the carrier devices path for moving past the fulfillment position, the carrier device is moved in step 212 to a secondary path, such as the second lane L2 in FIG. 4, to go around the obstacle, after which the carrier device may then move back to the primary path and return to step 204. In certain embodiments, the carrier device may remain on the secondary path until approaching the next fulfillment position required for finishing the food product associated therewith, and/or may at some point transition to a third path or other paths to provide optimal speed for finishing the food product.

Alternatively, if it is determined in step 206 that the fulfilment position is in fact required for that carrier device, it is next determined in step 214 whether an obstacle is in the way of the carrier device entering that fulfillment position. If so, the process continues with step 216, whereby the carrier device stops and waits, optimally out of the way of the obstacle (such a another carrier device presently stopped within that fulfillment position). The process then continues with step 214 again until the obstacle is determined to not be in the way of the carrier device entering the fulfilment position. Once the carrier device has a clear path as determined in step 214, the process continues with 218, whereby the carrier device enters the fulfillment station and receives the components and/or processing associated therewith. As discussed above, this may include the use of occupancy sensors 12 and occupancy indicators 14 to signal to other carrier devices that the fulfilment position is occupied. Likewise, this step may include the use of order tags 16 and order scanners 18 for completing the step of receiving the components and/or processing in step 218, and/or the use of status sensors 6 and/or in-process indicators 15 as discussed above.

Once the components and/or processing associated with the fulfilment station are completed in step 218, the process continues with step 220 whereby the carrier device exits the fulfilment position. The process then continues with step 22, which determines whether remaining components and/or processing are required for finishing the food product associated with the carrier device. If so, the process returns to step 202, whereby the carrier device moves along the primary path. It should be recognized that the carrier device may alternatively or additionally move along the secondary path or third path to provide optimal speed in arriving at the next fulfilment station at step 204. If instead it is determined in step 222 that the food product has been finished, the process proceeds to step 224, whereby in the present example the carrier device moves to a third path and moves to the ending point Z at the fastest possible speed.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

We claim:

1. A carrier device for transporting food products within an area, the device comprising:

a platform configured to support the food products;
a driving system configured to move the device;
a location detector configured to identify the location of the device within the area; and
a control system configured to control the driving system based on the location of the device identified by the location detector, wherein the control system is configured to move the device along a primary path defined between a starting point and an ending point and to one or more fulfilment positions therebetween, and wherein the control system is configured to move the driving system and the device off the primary path and along a secondary path distinct from the primary path to therefore bypass a portion of the primary path between the starting point and the ending point;
wherein the food products are received on the platform when the device moves to the one or more fulfilment positions.

2. The device according to claim 1, wherein the secondary path extends parallel to the primary path.

3. The device according to claim 1, wherein the control system is further configured to move the device back along the primary path after moving along the secondary path.

4. The device according to claim 1, wherein the control system is configured to move the device at a first speed when on the primary path and at a second speed that is different than the first speed when on the secondary path.

5. The device according to claim 1, further comprising a collision detector, wherein the control system is configured to prevent a collision with another object based on the collision detector.

6. The device according to claim 5, wherein the control system moves the device from the primary path to the secondary path to prevent the collision.

7. The device according to claim 1, wherein the location detector is configured to detect a position indicator associated with each of the one or more fulfilment positions.

8. The device according to claim 1, wherein the driving system includes a plurality of omnidirectional wheels.

9. The device according to claim 1, wherein the food product is a beverage and the one or more fulfilment positions is at least three fulfilment positions corresponding to black coffee, cream, and sweetener, respectively.

10. The system according to claim 1, wherein the location is moveably mounted with the device.

11. A system for assembling a food product in a container within an area, the system comprising:
one or more fulfillment positions each having a component of the food product to be assembled;
a primary path defined within the area and extending between a starting point and an ending point with the one or more fulfillment positions positioned therebetween;
a secondary path distinct from the primary path;
a device configured to move the container along the primary path during assembly of the food product;
a location detector configured to identify the location of the device within the area; and
a control system configured to control movement of the device based on the location of the device identified by the location detector, wherein the control system is configured to move the driving system and the device along the primary path and also to move the driving system and the device off the primary path and along a secondary path to therefore bypass a portion of the primary path between the starting point and the ending point;
wherein the food product is assembled in the container as the device moves through the one or more fulfilment positions.

12. The system according to claim 11, wherein the location detector is moveable with the device.

13. The system according to claim 11, wherein the primary path and the secondary path each extend linearly between the starting point and the ending point and are parallel to each other.

14. The system according to claim 11, wherein the primary path is closer than the secondary path to the one or more fulfilment positions.

15. The system according to claim 11, wherein the primary path is a closed loop such that the device may move from the starting point to the ending point and back to the starting point without departing the primary path.

16. The system according to claim 11, further comprising a collision detector, wherein the control system is configured to move the device from the primary path to the secondary path to prevent a collision with another object based on the collision detector.

17. The system according to claim 11, wherein the location detector is configured to detect a position indicator associated with each of the one or more fulfilment positions.

18. The system according to claim 17, wherein the position indicator is a color-based indicator.

19. The system according to claim 11, wherein the device includes first and second devices, and wherein the one or more fulfilment positions includes a drive-in fulfillment position that is off the primary path such that when the first device is at the drive-in fulfillment position the second device may move past the drive-in fulfilment position along the primary path.

20. A system for preparing beverages in cups within an area, the system comprising:
a plurality of fulfillment positions each having a component of the beverage to be assembled;
a primary path defined within the area and extending between a starting point and an ending point with the plurality of fulfillment positions positioned therebetween;
a secondary path defined within the area that is separate from the primary path and that also extends between the starting point and the ending point;
a plurality of devices each configured to move one of the cups along the primary path in a trackless manner during assembly of one of the beverages;
a plurality of order tags associated with the plurality of devices containing instructions for preparing the beverages, and a plurality of order scanners associated with the plurality of fulfillment positions that read the order tags and cause the plurality of fulfillment positions to dispense the components associated therewith according to the instructions;
location detectors each corresponding to one of the plurality of devices, the location detectors being configured to identify the locations of the devices within the area, respectively;
collision detectors each corresponding to one of the plurality of devices; and
control systems each corresponding to one of the plurality of devices, the control systems being configured to control movement of the plurality of devices based on the locations identified by the location detectors, respectively, and the control systems being configured to move the devices between the primary path and the secondary path to prevent a collision with another object based on the collision detector;

wherein the food product is assembled in the container as the device moves through the one or more fulfilment positions.

* * * * *